Nov. 8, 1932.                T. C. MANN                1,887,032
CHIP BREAKER FOR MOLDING MACHINES AND THE LIKE
Filed July 6, 1931
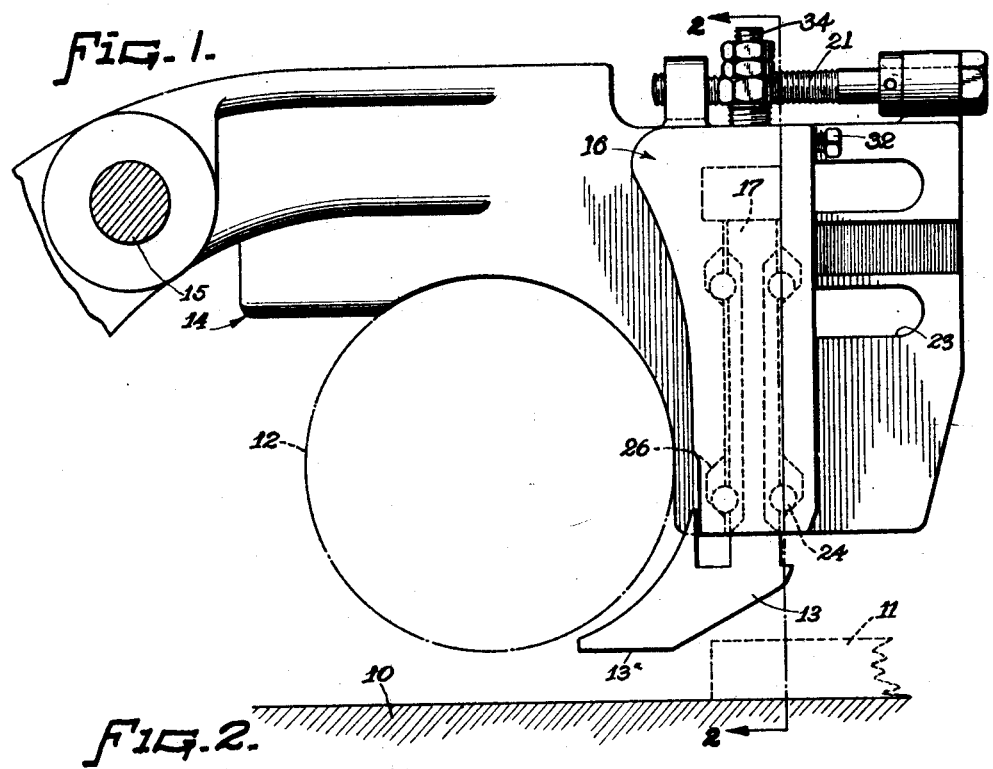
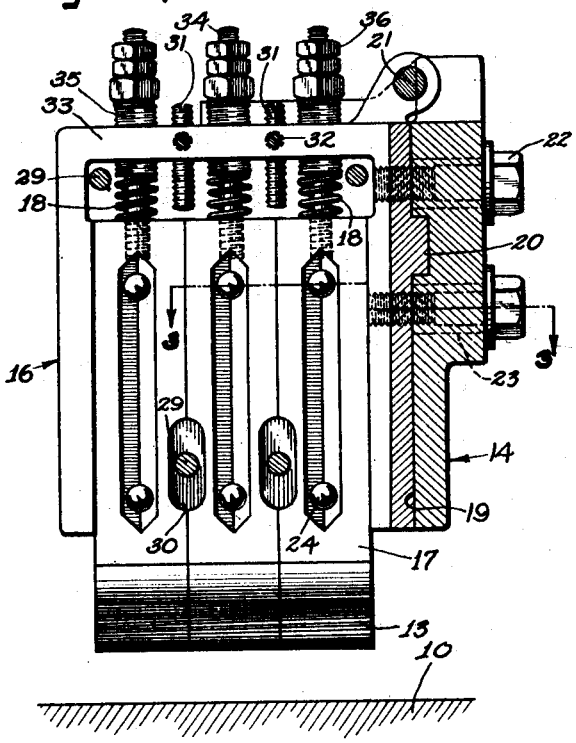
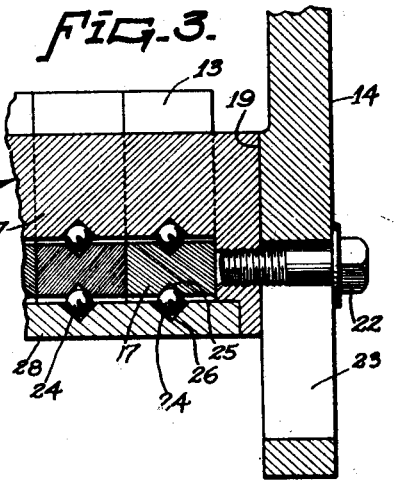
INVENTOR
THEODORE C. MANN
BY
Lindahl, Parker + Carlson
ATTORNEYS Patented Nov. 8, 1932

1,887,032

UNITED STATES PATENT OFFICE

THEODORE C. MANN, OF BELOIT, WISCONSIN, ASSIGNOR TO MATTISON MACHINE WORKS, OF ROCKFORD, ILLINOIS, A CORPORATION OF ILLINOIS

CHIP BREAKER FOR MOLDING MACHINES AND THE LIKE

Application filed July 6, 1931. Serial No. 548,843.

The invention relates generally to wood working machines such as molders or the like and more particularly it relates to chip breakers used in connection with the cutters of such machines to prevent splintering of the wood by the cutter knives.

Chip breakers of this character are commonly used in connection with the upper cutter of the machine and are arranged to press yieldingly against the upper surface of the work immediately adjacent to the cutter on the feeding-in side thereof. When variations in the surfaces of the work are encountered by the shoes of the chip breaker, upward movement of the shoes results.

An important object of the present invention is to provide a new and improved chip breaker wherein a plurality of yielding pressure shoes operable to hold the work firmly against the work table are easily movable in a vertical direction whereby to compensate for variations in the thickness of the work, and during shifting of the shoes to maintain a flat surface contact between the work and flat work-engaging surfaces formed on the lower ends of the shoes.

Another object of the invention is to provide such a chip breaker wherein the downward limit of movement of the shoes may be individually adjusted and the yielding pressure on each shoe varied for any such adjusted limit of shoe movement.

Another object is to provide an improved chip breaker in which the structure overlying the work table has an unusually small dimension longitudinally of the table whereby to decrease the distance between the feed rolls and the cutter.

Another object is to provide a chip breaker having a convenient, simplified and accurate mounting for the individually movable shoes thereof arranged to facilitate assembly or disassembly thereof for purposes of inspection, repair or replacement of the shoes.

Other objects and advantages will become apparent from the following description taken in connection with the accompanying drawing, in which:

Figure 1 is a fragmental elevational view of a chip breaker embodying the features of the invention, shown in operative association with a portion of a molding machine.

Fig. 2 is a vertical sectional view taken along the line 2—2 of Fig. 1.

Fig. 3 is a fragmental plan view taken in section along the line 3—3 of Fig. 2.

For purposes of disclosure, my improved chip breaker is illustrated as mounted on a molding machine having a base frame 10 providing an upper surface along which work such as a board 11 may be fed by conventional feed rolls (not shown) into operative relation to an upper rotatable cutter 12. The improved chip breaker generally considered, is one in which a plurality of shoes 13 are provided for yielding contact with the upper surface of the work 11 closely adjacent to the feeding-in side of the cutter 12, the shoes 13 being mounted for individual yielding movement in a vertical direction in a carrier 14, which in turn is mounted on the machine frame for yielding movement in a generally vertical direction. Thus the chip breaker may compensate for major variations in the work surface by upward movement of the carrier and the shoes as a unit, while slight variations in the work may be met by individual vertical movement of the particular shoe 13 which lies in the path of the varying portion of the work surface. As shown in Fig. 1 the shoes 13 have flat bottom surfaces 13ᵃ which contact the work over a substantial area so that the shoes act more effectively to prevent splintering of the wood. Such a flat surface reduces the amount of vertical movement of the shoes, since the shoes do not ride downwardly into minor depressions such as saw marks in the work. Since the individual movement of the shoes is in a vertical direction, this flat surface contact of the shoes with the work is maintained during the major portion of the working operation of the machine.

The carrier 14 is preferably in the form of an arm carrying the shoes 13 adjacent to one end thereof and projecting longitudinally of the bed of the machine to a pivotal support 15 located on the other side and above the axis of the cutter 12.

The mounting of the shoes 13 on the carrier

14 is accomplished in the present instance by a support in the form of a cross head 16 projecting laterally from the carrier 14 adjacent its free end, and this cross head is preferably in the form of a housing opening downwardly toward the bed of the machine to receive and guide upwardly extending shanks 17 formed on shoes 13. The housing thus provided also serves to enclose expansive coil springs 18 acting individually against the shanks 17 of the shoes to press the shoes against the work.

To permit adjustment of the shoes 13 toward and away from the periphery of the cutter 12, the cross head 16 and the carrier 14 having abutting surfaces 19 and interengaging ways 20 arranged to guide the cross head for movement longitudinally of the carrier, such adjusting movement being obtained by a screw device 21 acting between the cross head and the carrier. After adjustment, the cross head 16 is clamped firmly to the carrier by cap screws 22 extending through slots 23 in the carrier and engaging the cross head to draw the surfaces 19 into engagement.

In the operation of a machine of this character, the accuracy and smoothness of the surface of the finished work is dependent in a large measure upon the continuity of contact between the chip breaker shoes and the work so as to hold the work in firm contact with the work table. The present invention, therefore, provides for mounting the shoes 13 in the cross head 16 so as to be easily movable in response to variations in the work surface. Thus the shanks 17 of the shoes are guided for vertical movement in the cross head 16 by anti-friction means which preferably comprises a pair of balls 24 positioned in vertically spaced relation on each side of each of the shanks 17. To hold the balls 24 in place, each shank 17 has a comparatively long V-shaped groove 25 in each side thereof positioned in opposed relation to similar V-shaped grooves 26 formed in opposing side walls 27 and 28 of the cross head. The grooves 26 in the walls 27 and 28 are comparatively short as shown in Fig. 1 so that these grooves serve to space the balls 24 apart. The contact of the balls 24 with the sides of the grooves 25 and 26 serves to guide the shoes for true vertical movement and thereby avoids wobbling of the shoes and maintains the flat bottom surfaces 13ª of the shoes horizontal so as to contact the work over a substantial area.

Preferably the chip breaker is arranged to facilitate inspection, repair or replacement of the shoes 13 and the associated parts thereof, and to this end the wall 27 is removably secured to the cross head 16 by bolts 29, two of which extend through the housing above the shanks 17 and the other two of which extend through slots formed between the shanks 17 by the elongated notches 30 cut in the edges of the shanks.

To limit upward movement of the shoes 13 adjusting screws 31 are provided, locked in adjusted position by set screws 32, and extending through the top wall 33 of the housing in position to engage the upper end of the shank 17. Downward movement of the shoes 13 is also limited, preferably by means of an individually adjustable device for each shoe 13. Each of these devices preferably consists of a bolt 34 threaded into the upper end of the shank and extending upwardly through the coil spring 18 and through the wall 33 of the housing. The bolt also extends through a sleeve 35, against which the spring 18 abuts, and at its outer end the bolt carries adjusting nuts 36 one of which bears on the outer end of the sleeve 35.

The sleeve 35 is screw threaded into the wall 33 and through rotation of the sleeve by means of its squared upper end, the spring pressure on the associated shoe 17 may be varied. The construction is such that the desired yielding pressure on the shoe 13 may be obtained regardless of the extent of downward movement to which the shoe is adjusted. Such adjustment of the spring pressure and the extent of downward movement is of course obtained by coordinated adjustment of the sleeve 35 and the nuts 36. It will be seen that by reason of the location of the sleeve 35 and the nuts 36 at the top of the cross head, the desired adjustments may be made quite readily.

Through the provision of vertically guided shoes with horizontal bottom surfaces of substantial area, the present invention avoids undue movement of the shoes by minor variations in the work surface. The anti-friction mounting of the shoes serves to prevent binding of the shoes in their upward movement and insures prompt return movement after a projecting portion of the work has passed.

It will also be seen that the present chip breaker requires little space longitudinally of the machine and thereby permits the conventional feed rolls to be mounted quite close to the cutter.

I claim as my invention:

1. A chip breaker providing a support adapted to be mounted upon the frame of a molding machine or the like, a plurality of shoes adapted for engagement with the surface of a work piece, each of said shoes having a shank formed thereon, anti-friction means and bearing surfaces formed on said support and said shanks cooperating to prevent movement of the shanks in any direction laterally with respect to said shanks to guide said shoes for individual movement parallel to each other and prevent binding contact of the shanks with each other, and adjustable spring means acting between said support and said shoes to press said shoes in one direction with relation to said frame.

2. A chip breaker of the character described comprising a support providing a housing, said housing having one removable side wall, a plurality of shoes each having a shank extending into said housing, said shanks having grooves formed in opposed faces thereof and extending longitudinally thereof and said removable wall and the opposed wall of said housing having recesses therein facing the grooves in said shanks, anti-friction members in said grooves extending into said recesses to guide the shanks for movement relatively to said housing, and spring means acting between the housing and said shanks to press said shoes outwardly of said housing.

3. A chip breaker of the character disclosed comprising in combination, a support in the form of a housing having one open end and one removable side wall, a plurality of shoes each having a shank extending into said housing, each of said shanks having elongated V-shaped grooves in opposite sides thereof facing toward the removable wall and the opposed side wall of said housing, and said walls having V-shaped grooves facing the grooves in said shanks, there being two such grooves in each of said walls for each of said shanks and the grooves in said walls being relatively short, and an anti-friction member in each of the grooves in said walls engaging the opposed grooves in the shanks.

4. A chip breaker comprising a support providing a vertical guideway having one removable portion, a pressure shoe having a shank projecting upwardly along said guideway, said guideway and said removable portion of the guideway and said shank having opposed vertical grooves formed therein, a plurality of anti-friction members in said grooves to guide said shank for vertical movement; certain of said grooves being relatively short so as to space said members vertically from each other, and resilient means acting against said shank to urge said shoe downwardly.

In testimony whereof, I have hereunto affixed my signature.

THEODORE C. MANN.